US011036528B2

(12) United States Patent
Wang et al.

(10) Patent No.: US 11,036,528 B2
(45) Date of Patent: Jun. 15, 2021

(54) EFFICIENT PROFILING-BASED LOCK MANAGEMENT IN JUST-IN-TIME COMPILERS

(71) Applicant: International Business Machines Corporation, Armonk, NY (US)

(72) Inventors: Ting Wang, Shanghai (CN); Xiao Ping Guo, Shanghai (CN); Ao Hang, Shanghai (CN); Gui Haochen, Shanghai (CN); Yang Liu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/590,617

(22) Filed: Oct. 2, 2019

(65) Prior Publication Data

US 2021/0103453 A1    Apr. 8, 2021

(51) Int. Cl.
*G06F 9/52*      (2006.01)
*G06F 9/455*     (2018.01)

(52) U.S. Cl.
CPC .............. *G06F 9/4552* (2013.01); *G06F 9/52* (2013.01)

(58) Field of Classification Search
CPC ................................ G06F 9/4552; G06F 9/52
See application file for complete search history.

(56) References Cited

U.S. PATENT DOCUMENTS

| 7,159,220 | B2 | 1/2007 | Buch | |
| 7,765,555 | B2 | 7/2010 | Detlefs et al. | |
| 7,814,488 | B1 * | 10/2010 | Dice | G06F 9/526 718/103 |
| 8,266,607 | B2 | 9/2012 | Burka et al. | |
| 2006/0288351 | A1 * | 12/2006 | Detlefs | G06F 9/528 718/107 |
| 2007/0169002 | A1 * | 7/2007 | Kronlund | G06F 9/526 717/130 |
| 2012/0054394 | A1 * | 3/2012 | Namjoshi | G06F 9/526 710/200 |

(Continued)

OTHER PUBLICATIONS

Kenneth Russell and David Detlefs "Eliminating synchronization-related atomic operations with biased locking and bulk rebiasing," ACM SIGPLAN, Oct. 2006, 10 pages.

(Continued)

*Primary Examiner* — Wei Y Zhen
*Assistant Examiner* — Amir Soltanzadeh
(74) *Attorney, Agent, or Firm* — Patterson + Sheridan, LLP

(57) ABSTRACT

Aspects of the present disclosure describe techniques for managing locks in just-in-time compiled code in a software application. An example method generally includes profiling locks by during execution of the JIT compiled code. Locks are generally profiled by identifying locks on resources accessed by the JIT compiled code, and recording access information for each of the identified locks. When a safepoint is reached during execution of the JIT compiled code, one or more locks eligible for conversion to a biased lock are identified .based on the recorded access information for each of the identified locks, one or more locks eligible for conversion to a biased lock. Each respective lock of the one or more eligible locks is converted to a biased lock based on a current lock status of the respective lock.

25 Claims, 5 Drawing Sheets

(56) References Cited

U.S. PATENT DOCUMENTS

2013/0047163 A1\* 2/2013 Marathe .............. G06F 11/3608
718/104

OTHER PUBLICATIONS

Marcus Larsson, "Evaluating and improving biased locking in the HotSpot virtual machine," KTH Computer Science and Communication, Jun. 26, 2014, 52 pages.
Pizlo et al., "Fine-Grained Adaptive Biased Locking," PPPJ '11, Aug. 24-26, 2011, 11 pages.
Ian Rogers and Balaji Lyengar, "Reducing Biased Lock Revocation by Learning," ICOOOLPS'11, Jul. 26, 2011, 10 pages.
Vasudevan et al., "Simple and Fast Biased Locks," PACT'10, Sep. 11-15, 2010, 9 pages.

\* cited by examiner

EFFICIENT PROFILING-BASED LOCK MANAGEMENT IN JUST-IN-TIME COMPILERS

BACKGROUND

The present invention relates to synchronized access to resources in software applications, and more specifically to optimizing the performance of synchronized access to resources in software applications.

In a multithreaded software application, different functions of the software application may execute using different threads. These threads may execute substantially concurrently and may utilize common resources, such as objects in memory, access to hardware resources, and the like. In some cases, concurrent access to common resources may be undesirable for various reasons. For example, the state of these common resources (e.g., the contents of an object stored in memory) may be changed by one thread while another thread is attempting to access the common resources, which may lead to a memory interference scenario in which inconsistencies between the expected actions of each thread exist based on the performance of actions based on different data. In some cases, concurrent access to common resources may also lead to race conditions, where a software application fails to execute correctly because of timing issues between operations performed on the concurrently accessed common resources.

To mitigate problems that exist from concurrent access to computing resources, programming languages support various techniques of enforcing mutually exclusive access to these resources. These techniques may include, for example, locks, mutual exclusion objects, semaphores, and other techniques that synchronize access to objects such that only one thread has access to an object at any given time. To synchronize access to objects, locks and other mechanisms for enforcing exclusive access to objects may be implemented using atomic instructions which enforce completion of an operation by a thread before another thread can access these objects.

Executing atomic instructions generally imposes performance penalties on software applications. These performance penalties may vary depending on the computing platform on which a software application is being executed. For example, if a processor does not support atomic operations, additional instructions may need to be executed in order to prevent other threads from obtain access to an object. These additional instructions may include, for example, disabling interrupts prior to performing an atomic operation, and enabling interrupts after performing the atomic operations, which may insert numerous processing cycles into the execution of a software application. To address the performance penalties of locks used to enforce mutually exclusive access to objects, other software-based techniques may be used. For example, biased locks may allow access to an object on a non-contention basis. These biased locks may entail the execution of no atomic operations if a lock is biased towards a particular thread and there is no contention for the object and may have a significant cost (e.g., of pausing threads of the software application) if other threads content for access. Lightweight locks may entail the execution of a single atomic operation if multiple threads are not contenting for an object and may turn into a heavyweight lock if multiple threads contend for access to the object. Finally, heavyweight locks, which involve the use of a wait queue to allow threads to access an object, may be used in scenarios in which multiple threads frequently content for access to the object.

SUMMARY

One aspect of the present disclosure provides a method for managing locks in just-in-time (JIT) compiled code of a software application executing on a computing device. The method generally includes profiling locks by during execution of the JIT compiled code. Locks are generally profiled by identifying locks on resources accessed by the JIT compiled code, and recording access information for each of the identified locks. When a safepoint is reached during execution of the JIT compiled code, one or more locks eligible for conversion to a biased lock are identified .based on the recorded access information for each of the identified locks, one or more locks eligible for conversion to a biased lock. Each respective lock of the one or more eligible locks is converted to a biased lock based on a current lock status of the respective lock.

Another aspect of the present disclosure provides a system having a processor and memory having instructions stored thereon which, when executed by the processor, performs an operation for managing locks in just-in-time (JIT) compiled code of a software application executing on a computing device. The operation generally includes profiling locks by during execution of the JIT compiled code. Locks are generally profiled by identifying locks on resources accessed by the JIT compiled code, and recording access information for each of the identified locks. When a safepoint is reached during execution of the JIT compiled code, one or more locks eligible for conversion to a biased lock are identified .based on the recorded access information for each of the identified locks, one or more locks eligible for conversion to a biased lock. Each respective lock of the one or more eligible locks is converted to a biased lock based on a current lock status of the respective lock.

Still another aspect of the present disclosure provides a computer-readable medium which, when executed by a processor, performs an operation for managing locks in just-in-time (JIT) compiled code of a software application executing on a computing device. The operation generally includes profiling locks by during execution of the JIT compiled code. Locks are generally profiled by identifying locks on resources accessed by the JIT compiled code, and recording access information for each of the identified locks. When a safepoint is reached during execution of the JIT compiled code, one or more locks eligible for conversion to a biased lock are identified .based on the recorded access information for each of the identified locks, one or more locks eligible for conversion to a biased lock. Each respective lock of the one or more eligible locks is converted to a biased lock based on a current lock status of the respective lock.

DETAILED DESCRIPTION

Locks and other mutual access mechanisms allow multithreaded applications to access and perform operations with respect to objects in memory without incurring memory interference problems, race conditions, or other problems that may arise when multiple threads simultaneously attempt to perform operations with respect to a given object in memory. Because locks have a negative performance impact on multithreaded software applications, various techniques have been used to attempt to improve the performance of these software applications. Generally, these techniques attempt to balance a monitor that orchestrates mutual access to objects in memory between biased and lightweight locks based on the performance characteristics of these locks (with biased locks providing better performance than lightweight locks) and access patterns with respect to an object in memory. In one example, locks may initially exist as biased locks and may fallback to lightweight locks according to lock revocation statistics. In other examples, the type of lock used to manage access to an object in memory may be determined based on lock and object instance profiling.

These techniques, however, entail significant overhead in adjusting between lightweight and biased locks for locks on objects that are not frequently accessed by multiple threads in a multithread software application. Further, these techniques may adjust locks in a manner such that biased locks are permanently converted to lightweight locks. Because, as discussed above, lightweight locks are more expensive than biased locks, permanently converting biased locks to lightweight locks may impose a performance penalty on a software application, even when conditions revert back to a state when biased locks may be used to control access to an object in memory.

Aspects of the present disclosure provide techniques for managing locks in just-in-time compiled code of a software application in a manner that optimizes performance by converting lightweight locks to biased locks where possible. As discussed in further detail below, a just-in-time compiler gathers lock information during execution of a multithreaded software application to track usage of each lock in the software application. When execution of the software application reaches a global safepoint, such as a garbage collection time in which the just-in-time compiler deallocates memory assigned to objects that are not referenced or otherwise used by code in the software application, the just-in-time compiler identifies locks that are eligible for conversion from a lightweight lock to a biased lock (i.e., conversion to a less expensive locking mechanism) and converts the identified eligible locks into biased locks (or other less expensive locking mechanisms), with biases for each eligible lock determined based on the current lock status of the respective eligible lock.

Figure 1:
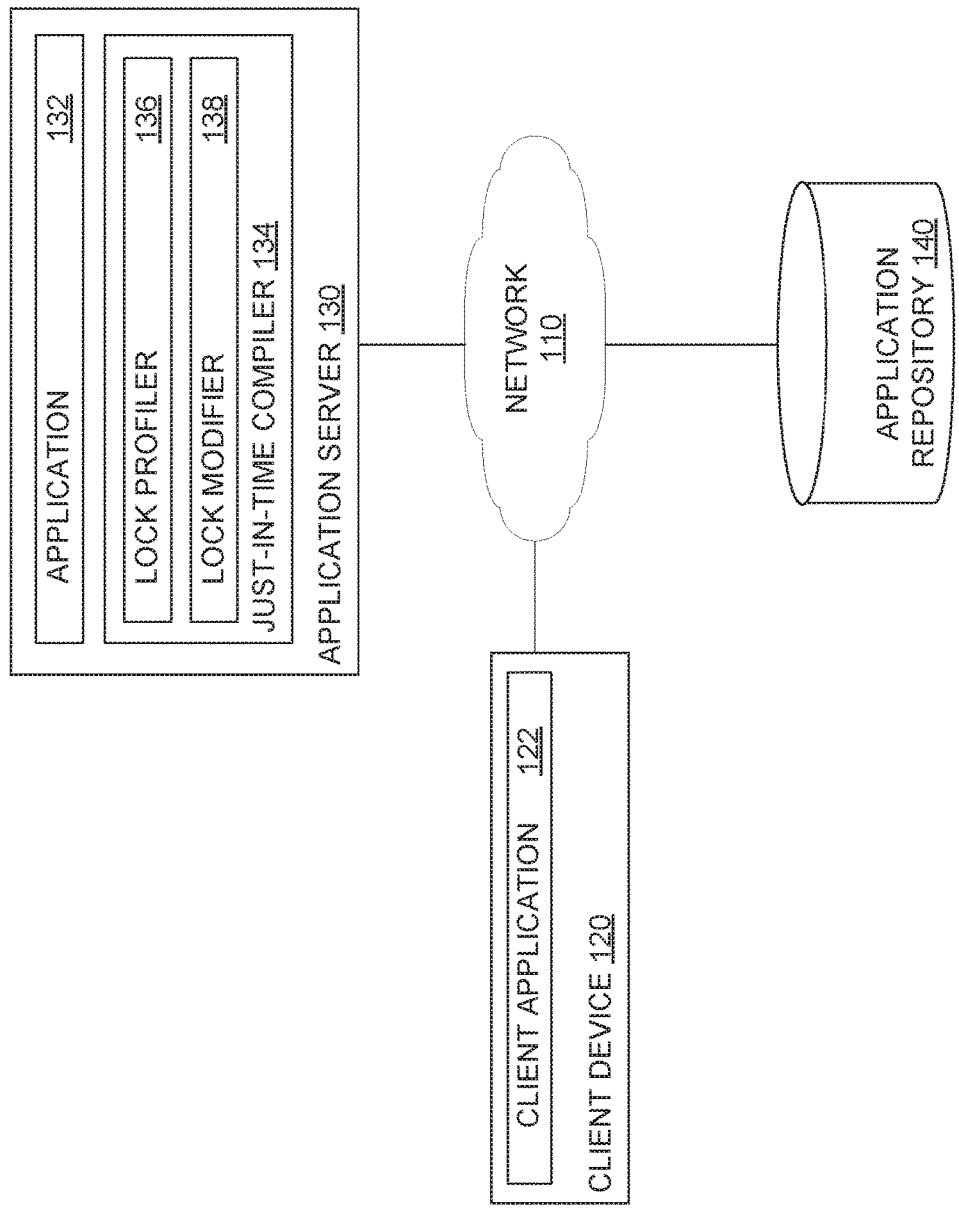
FIG. 1 illustrates an example networked computing environment in which a just-in-time (JIT) compiler manages locks during execution of JIT compiled code of a software application on an application server, according to an embodiment.

FIG. 1 illustrates an example networked computing environment in which a compiler manages locks in just-in-time compiled code for an application executing on an application server and accessible to a client device, according to an embodiment of the present disclosure. As illustrated, computing environment 100 includes a client device 120, an application server 130, and an application data store 140.

Client device 120 is generally representative of computing devices on which a user can access functionality provided by a software application executing on a remote computing device (e.g., application server 130). As illustrated, client device 120 includes a client application 122. Client application 122 may be a web browser or other application that allows a user to interact with a software application executing on an application server 130 or other remote computing device. Data may be uploaded to application server 130 for processing, and the results of the processing may be provided by application server 130 to client application 122 for display and persistence to a local or remote data store.

Application server 130 generally hosts one or more applications that execute using a just-in-time compiler that manages locks on objects in memory of application server 130. As illustrated, application server 130 includes one or more applications 132 and a just-in-time compiler 134.

Applications 132 are representative of various applications that may execute on application server 130 to perform one or more tasks as instructed by a client application 122. Generally, applications 132 may be written in a language that allows for just-in-time compilation of source code or intermediate code into machine code that executes on one or more processors of application server 130. For example, applications 132 may be written in the Java programming language and may be stored on application server 130 (or a remote application repository 140) in an intermediate representation that can be compiled and executed by just-in-time compiler 134.

Just-in-time compiler 134 generally compiles source code or intermediate code into machine code and executes the machine code on application server 130 to execute application 132. In some embodiments, just-in-time compiler 134 may be part of a language-specific virtual machine, such as the Java virtual machine, that executes applications 132 written in the language(s) supported by the language-specific virtual machine. As discussed in further detail below, just-in-time compiler 134 manages locks on objects in memory of application server 130 during execution of the applications 132 such that lower performing locks, such as lightweight locks or heavyweight locks, are used to manage access to objects in memory only when necessary (e.g., when multiple threads contend for access to an object) and biased locks are typically used to manage access to objects in memory. As illustrated, just-in-time compiler 134 includes a lock profiler 136 and a lock modifier 138.

Lock profiler 136 generally monitors execution of an application 132 and generates a profile of the locks used by application 132 for use by lock modifier 138 in managing the locks, as discussed in further detail below. Generally, to profile locks on objects during execution of an application 132, just-in-time compiler 134 executes instrumentation configured to gather lock information during execution of application 132. When lock profiler 136 detects that a thread of application 132 is attempting to access an object on which a lock exists, lock profiler 136 can record information about the lock and save the recorded information to an internal repository that tracks each lock that application 132 uses to access objects in memory of application server 130. The internal repository may record the existence of each lock, the type of each lock (i.e., whether a lock is a biased lock, a lightweight lock, or a heavyweight lock), the current owner of each lock, a memory address of the object associated with each lock, and a counter of the number of times a thread in application 132 has obtained each lock. Lock profiler 136 can update a record associated with a lock each time a thread in application 132 attempts to obtain a lock, and updates may be performed based on the current state of the lock. For example, if a biased lock is currently owned by a first thread and a second thread attempts to obtain the lock, lock profiler 136 can determine that a contention scenario exists with respect to the lock. The lock may thus be converted to a lightweight lock (i.e., a lock in which the thread to which the lock is biased can obtain the lock without using an atomic operation, and other threads obtain the lock using an atomic operation), and the corresponding record associated with the lock may be updated to reflect that the lock is now a lightweight lock. In another example, if a lock is repeatedly the subject of contention from multiple threads, lock profiler 136 can convert the lock to a heavyweight lock (i.e., a lock in which a queue is used to manage access to an object in memory associated with the lock) and update the corresponding record associated with the lock to reflect that the lock is now a heavyweight lock.

In some embodiments, lock profiler 136 may dynamically activate and deactivate the instrumentation configured to gather lock information during execution of application 132. Generally, the instruction may be activated or deactivated when just-in-time compiler 134 reaches a safepoint in execution of application 132. Activation and deactivation of the instrumentation configured to gather lock information may be performed based on performance metrics determined for the application server 130 and/or an application 132. For example, if an application server 130 is determined to have limited available resources, the instrumentation can be activated to optimize performance of the application 132 and reduce the number of expensive locks used by the application. In another example, the instrumentation may be activated and deactivated according to a policy that defines a periodicity at which locks are to be profiled and managed.

In some embodiments, lock profiler 136 may be configured to gather lock information on a per-thread basis and profile locks for frequently invoked methods. Lock profiler 136 may gather lock information during execution of methods in application 132 that are invoked more than a threshold number of times (referred to herein as a "hot" method) and need not gather lock information during execution of methods in application 132 that are invoked less than the threshold number of times. The threshold number of times may be set, for example, based on a compile threshold used by just-in-time compiler 134 to determine when to compile source or intermediate code into machine code. Generally, if lock profiler 136 determines that a method is a "hot" method, lock profiler 136 monitors execution of the method for invocation of a lock acquire operation. When a lock acquire operation is detected, lock profiler injects machine code instructions to retrieve a starting address of a lock profiling record associated with the currently executing thread, identify a memory address of the next available lot within the lock profiling record, store the start address of the current lock into the slot pointer field, and increment the slot counter field.

Lock modifier 138 generally is invoked when just-in-time compiler 134 reaches a global safepoint during execution of application 132. As discussed, a global safepoint generally is a time period during which execution of application 132 is temporarily paused for just-in-time compiler 134 to perform garbage collection and other cleanup operations in respect of previously created objects in memory. As discussed in further detail below, lock modifier 138 identifies lightweight locks that are eligible for conversion into biased locks and converts these locks from lightweight locks to biased locks.

To identify locks that are eligible for conversion into biased locks, lock modifier 138 can maintain a blacklist and a whitelist of locks across the lifecycle of application 132. The blacklist of locks generally includes heavyweight locks, or locks associated with resources that are frequently subject to contention by multiple threads of application 132. Because these locks are associated with resources that are frequently subject to contention, conversion of such locks to a biased lock or a lightweight lock may have little effect on the performance of application 132, as these locks are likely to become heavyweight locks after execution of application 132 resumes. To populate the blacklist, lock modifier 138 examines the lock profile records associated with each thread in application 132 and identifies locks that appear in the lock profile records of multiple threads. The locks included in the blacklist may thus remain heavyweight locks during execution of the application 132. In some embodiments, the blacklist may additionally include some lightweight locks that appear in the lock profile records of multiple records. These locks may be removed from the blacklist during a subsequent invocation of lock modifier 138 by determining that a single thread references the lock or has referenced the lock over a threshold period of time.

The whitelist of locks generated by lock modifier 138 generally includes lightweight locks that may be eligible for conversion into a biased lock. To populate the whitelist, lock modifier 138 can examine the lock profile records for each thread to identify lightweight locks that have an invocation count greater than a threshold invocation count value. The threshold invocation count value may be based on a compile threshold value used by just-in-time compiler 134 to determine when to compile source or intermediate code into machine code for execution. In some embodiments, the threshold invocation count value may be a value between a compile threshold value for compiling source or intermediate code into unoptimized machine code and a compile threshold value for compiling source or intermediate code into optimized machine code.

Lock modifier 138 then converts each respective lock found on the whitelist and not found on the blacklist to a biased lock based on a current state of each respective lock. If a lock on the whitelist is a lightweight lock that is not currently owned by a thread of application 132, lock modifier 138 can transform the lightweight lock into an anonymous biased lock. This anonymous biased lock may be available for bias towards any thread executing in application 132. For example, just-in-time compiler 134 can bias the lock in a greedy manner (e.g., towards the next thread that obtains the lock) or based on heuristics associated with the lock (e.g., towards the thread that most frequently obtained the lock on the object in memory). If a lock on the whitelist is a lightweight lock that is currently owned by a thread of application 132, lock modifier 138 can transform the lightweight lock into a biased lock, with a bias set towards the thread that currently owns the lock. By biasing the lock towards the thread that currently owns the lock, the thread that currently owns the lock can quickly access the object associated with the lock (e.g., access the object without performing an atomic operation), while other threads that are presumed to not as frequently access the object associated with the lock may access the object by performing an atomic operation.

In some embodiments, the lock management techniques described herein may be used in conjunction with other lock management techniques used to improve the performance of applications 132 executing on application server 130. For example, the lock management techniques described herein may be used in conjunction with a heuristic algorithm for managing locks used by an application 132, which initiates locks as biased locks and falls back to lightweight locks based on lock revocation statistics calculated during execution of the application 132.

Application repository 140 generally serves as a repository for application packages that can be executed as application 132 on application server 130. The application packages stored in application repository 140 may be application source code projects or applications compiled into intermediate code that is then compiled by just-in-time compiler 134 during application runtime. In some embodiments, application repository 140 may further serve as a repository for data used by application 132 during execution of the application.

Figure 2:
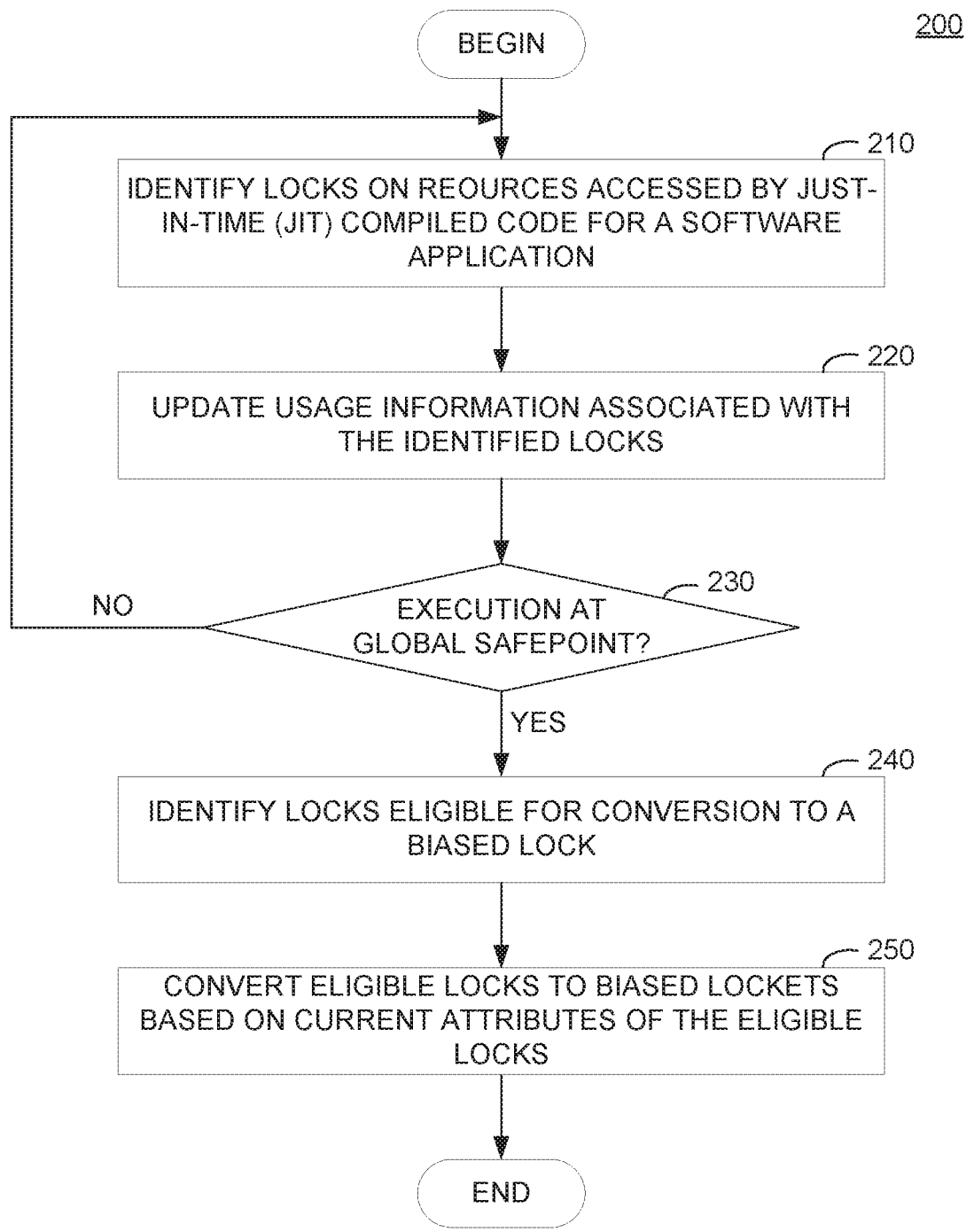
FIG. 2 illustrates example operations for managing locks in just-in-time compiled code of a software application executing on a computing device, according to an embodiment.

FIG. 2 illustrates example operations 200 that may be performed by a just-in-time compiler (e.g., just-in-time compiler 132 illustrated in FIG. 1) to manage locks on objects during execution of just-in-time compiled code of a software application. As illustrated, operations 200 begin at block 210, where a just-in-time compiler identifies locks on resources accessed by just-in-time compiled code for a software application. As discussed, locks may be identified on resources, such as objects in memory, by monitoring for execution of one or more instructions for acquiring a lock on a resource. For example, a just-in-time compiler can identify an instruction as an instruction for acquiring a lock on a resource by examining each instruction at the top of a call stack to determine whether the instruction includes a reserved word or opcode that indicates that the instruction is being used to attempt to obtain a lock on a resource. In some embodiments, as discussed above, the just-in-time compiler can monitor for the acquisition on locks on resources in a computing system by particular functions in the application. These functions may be, for example, functions that are invoked more than a threshold number of times or other segments of code that are frequently executed.

At block 220, the just-in-time compiler updates usage information associated with the identified locks. In some embodiments, the usage information may be updated for the thread that is attempting to obtain a lock on a resource. For example, as discussed above, the just-in-time compiler can update the usage information associated with the identified locks by adding a record to a lock profiling record for the thread that is attempting to acquire the lock on the resource. In some embodiments, the just-in-time compiler can update an existing record in the lock profiling record for the lock for each attempt to acquire the lock. Generally, updating the record in the lock profiling record may entail incrementing a lock acquisition counter associated with the lock in the lock profiling record.

At block 230, the just-in-time compiler determines whether execution of the application is at a global safepoint. As discussed, a global safepoint generally is a period in time during which execution of a software application (e.g., compilation of source or intermediate code associated with the software application, execution of compiled code, etc.) is temporarily paused so that a just-in-time compiler can perform garbage collection and other operations on objects stored in memory allocated for the application. If the just-in-time compiler has not reached a global safepoint, operations 200 may return to block 210 for the identification of locks and updating of usage information associated with the identified, as discussed above. If, however, the just-in-time compiler determines that execution of the application has reached a global checkpoint, the just-in-time compiler can determine that lock management and modification may be performed with respect to various objects generated during execution of a software application.

At block 240, the just-in-time compiler identifies locks accessed by threads of an application compiled and executed by the just-in-time compiler that are eligible for conversion to a biased lock. As discussed, to identify locks that are eligible for conversion to a biased lock, the just-in-time compiler can generate a listing of locks that exist in the operating environment for the application and information about each thread that has attempted to acquire the lock. Generally, visibility of a lock to one or more threads of the application may be used to determine whether to place a lock on a blacklist or a whitelist. If a lock, identified by a memory address of an object in memory or some other identifier that uniquely identifies a lock, is included in the lock profiling records of multiple threads, the just-in-time compiler can assume that the lock is associated with an object that multiple threads content for and thus that the lock cannot be converted from a heavyweight lock or lightweight lock to a biased lock. These locks may thus be placed on a blacklist of locks that are ineligible for conversion. Other locks may be placed on a whitelist based, for example, on a number of times during execution of the application that a lock is acquired and the inclusion of the lock in the lock profiling records of a single thread. If a lock is acquired more than a threshold number of times (either from the moment at which execution of the application begins, or over a rolling time window), and if the lock is included in the lock profiling records of a single thread, the just-in-time compiler can add the lock to a whitelist of locks that can be converted from a lightweight lock to a biased lock.

At block 250, the just-in-time compiler converts the eligible locks to biased locks based on the current attributes of the eligible locks. As discussed, a bias parameter may be set for each lock, after conversion of the lock to a biased lock from a lightweight lock, based on whether a thread of the executing application currently has possession of the lock. If no thread in the executing application currently has possession of the lock, the just-in-time compiler can convert the lock to a biased lock with an anonymous or null thread bias. As discussed, after conversion of the lock to a biased lock, the lock may become biased based on execution history attributes, heuristics, and other metrics that can be used to determine how to bias a lock so that threads that regularly acquire the lock in order to perform operations in respect of an object in memory associated with the lock can quickly interact with the object in memory (e.g., can perform operations in respect of the object in memory without adversely affecting the performance of the executing application or other applications executing on the source system on which the just-in-time compiled application is executing). Otherwise, if a thread in the executing application currently has possession of a lock, but the lock is not found in the lock profiling records of multiple threads, the just-in-time compiler can convert the lock into a biased lock that is biased towards the thread that currently owns the lock. As discussed, biasing a lock towards the thread (or application) that currently owns the lock may allow for that thread to quickly access the object protected by the lock based on an assumption that the thread is likely to frequently access the object and that handling acquisitions on such locks would be a time consuming process.

Figure 3:
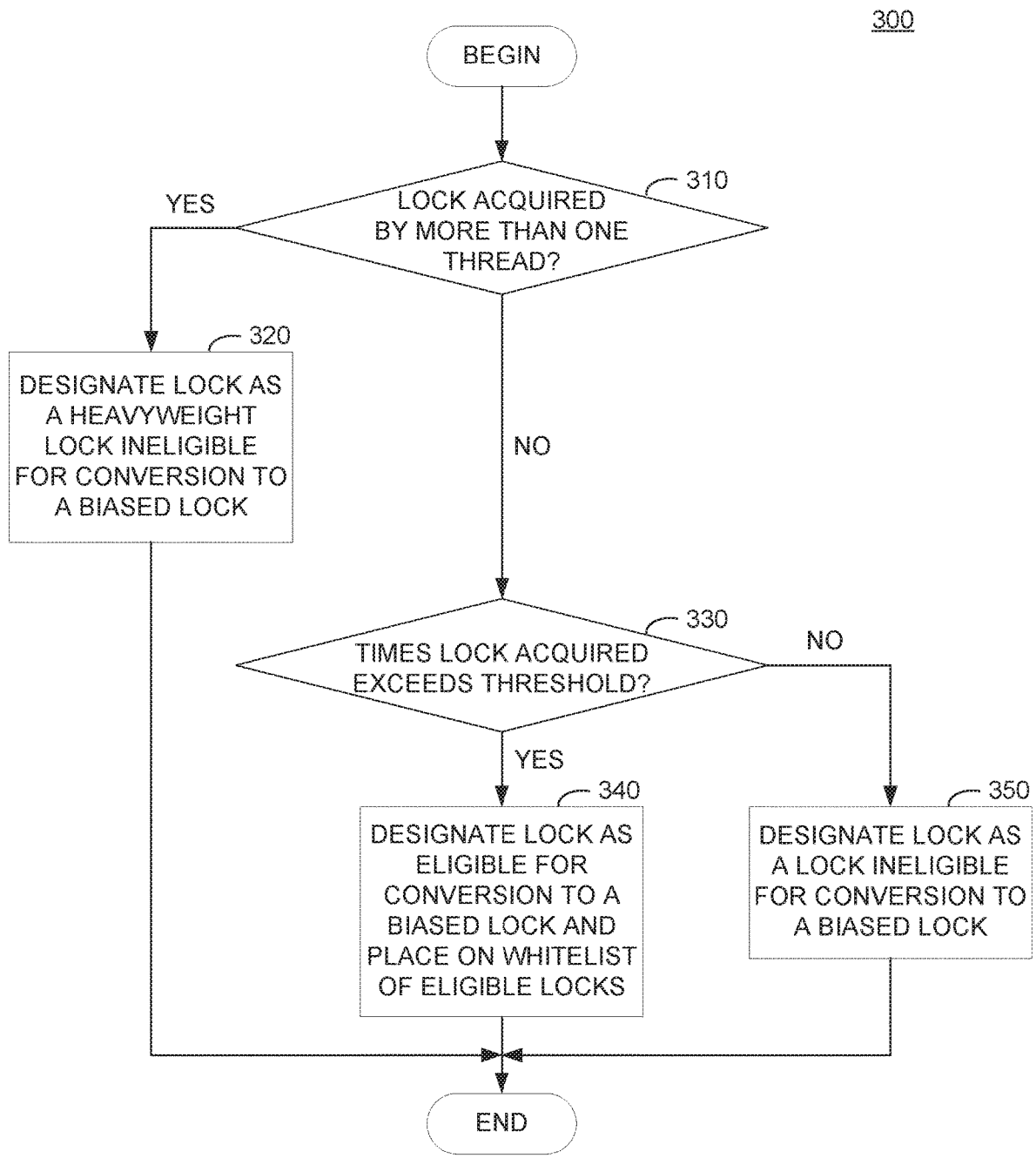
FIG. 3 illustrates example operations for identifying locks eligible for conversion to a biased lock, according to an embodiment.

FIG. 3 illustrates example operations 300 that may be performed by a just-in-time compiler (e.g., just-in-time compiler 132 illustrated in FIG. 1) for determining whether a lock is eligible for conversion to a biased lock when execution of an application reaches a global safepoint, As discussed above, the determination of whether a lock is eligible for conversion to a biased lock may be performed when execution of the application reaches the global safepoint and prior to the conversion of locks from lightweight to biased locks. As illustrated, operations 300 begin at block 310, where the just-in-time compiler determines if a lock has been acquired by more than one thread of the application. As discussed, the just-in-time compiler can determine that a lock has been acquired by more than one thread of the application by determining that a lock, identified by a memory address of an object in memory protected by the lock or some other unique identifier, is included in the lock profiling records of multiple threads.

If, at block 310, the just-in-time compiler determines that the lock has been acquired by multiple threads during the time window in which lock acquisition patterns are being analyzed, operations 300 may proceed to block 320, where the just-in-time compiler designates the lock as a heavyweight lock ineligible for conversion to a biased lock. Generally, designating the lock as a heavyweight lock ineligible for conversion to a biased lock may include placing the lock on a blacklist used by the just-in-time compiler to confirm that a lock can be converted to a biased lock. After designating the lock as a heavyweight lock that is ineligible for conversion to a biased lock, operations 300 may terminate with respect to the lock being analyzed.

Otherwise, if the just-in-time compiler determines at block 310 that the lock has been acquired by a single thread during the time window in which lock acquisition patterns are being analyzed, operations 300 may proceed to block 330, where the just-in-time compiler determines whether the number of times the lock was acquired exceeds a threshold value. As discussed, the threshold value may be a value determined based on compilation triggers that are used to determine whether to compile code into unoptimized machine code or into optimized machine code. A lock having been acquired more than a threshold number of times may be assumed to be associated with frequently accessed objects in memory that can benefit from a reduction in the processing cost needed to access these objects, while locks having been acquired less than the threshold number of times may be assumed to be associated with less frequently accessed objects in memory for which reductions in the processing cost needed to access these objects may have a smaller performance impact on the application.

If, at block 330, the just-in-time compiler determines that the lock has been acquired more than the threshold number of times, operations 300 proceed to block 340, where the just-in-time compiler designates the lock as eligible for conversion to a biased lock. In designating the lock as eligible for conversion to a biased lock, the just-in-time compiler can place the lock (or information identifying the lock, such as a memory address of the object associated with the lock or some other unique identifier associated with the lock) on a whitelist of eligible locks. As discussed, the whitelist of eligible locks may be subsequently used to convert locks from lightweight locks to biased locks.

If, however, at block 330, the just-in-time compiler determines that the lock has not been acquired more than the threshold number of times, operations 300 proceed to block 350, where the just-in-time compiler designates the lock as ineligible for conversion to a biased lock at the present time. These locks, however, may not be placed on the blacklist described above, as it is possible for these locks to become eligible for conversion to a biased lock at a future point in time if the lock is not acquired by multiple threads (i.e., the lock does not become a heavyweight lock in the future).

Figure 4:
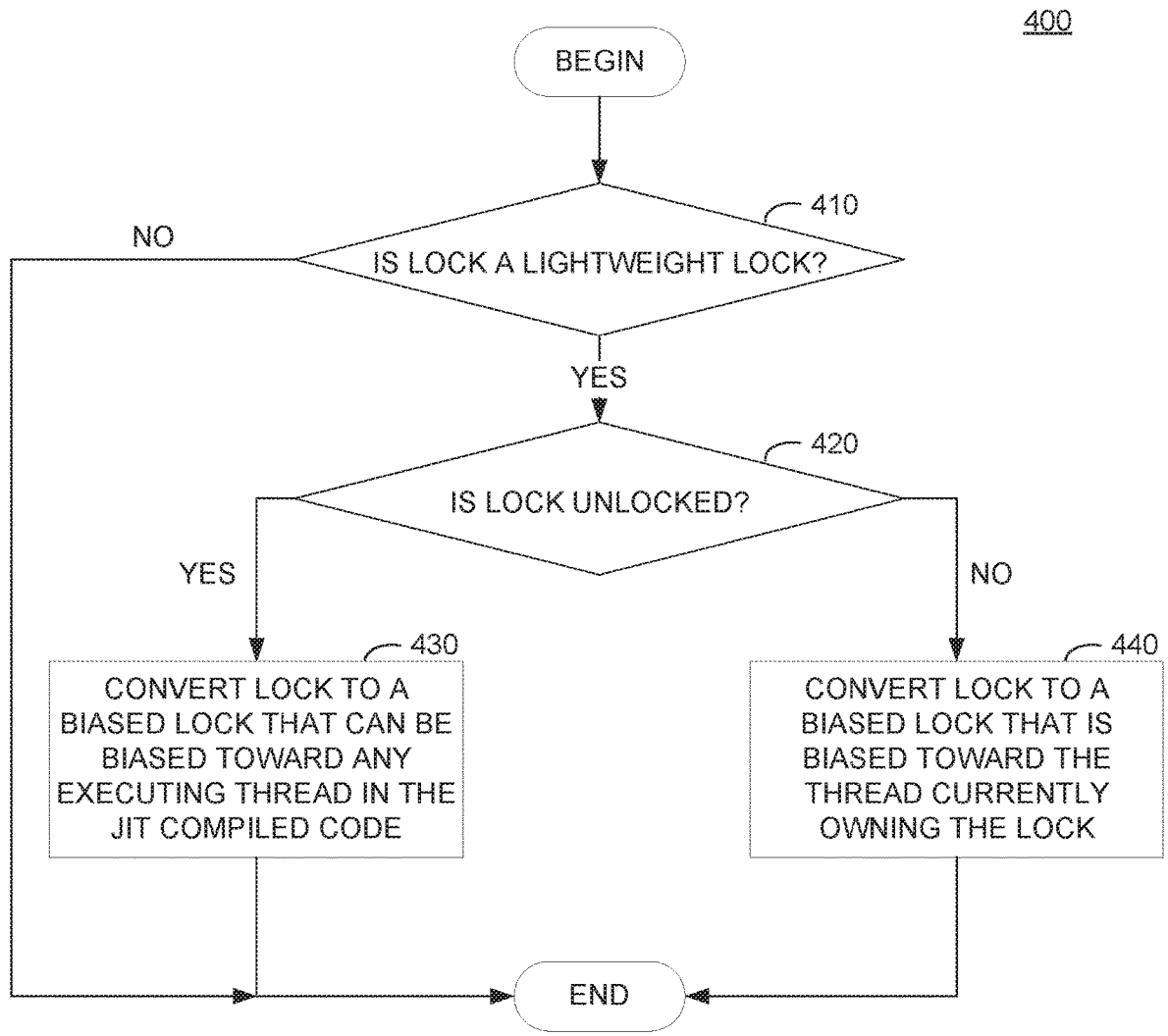
FIG. 4 illustrates example operations for converting lightweight locks to biased locks to optimize performance of a software application, according to an embodiment.

FIG. 4 illustrates example operations 400 that may be performed by a just-in-time compiler (e.g., just-in-time compiler 132 illustrated in FIG. 1) for converting lightweight locks included in a whitelist of eligible locks to biased locks while execution of an application is at a global safepoint. As illustrated, operations 400 begin at block 410, where the just-in-time compiler determines whether a lock is a lightweight lock. As discussed, a lightweight lock may be a lock associated with an object that is infrequently the subject of contention between multiple threads (i.e., that is the subject of contention at a frequency less than that needed for a lock to become a heavyweight lock). If the lock is a biased lock, no further conversion may be possible, and operations 400 may terminate in respect of the lock. Otherwise, if a lock is determined to be a lightweight lock, operations 400 may proceed to block 420.

At block 420, the just-in-time compiler determines whether the lock is currently unlocked. If the lock is currently unlocked, operations 400 may proceed to block 430, where the just-in-time compiler converts the lock to a biased lock that can be biased towards any executing thread in the just-in-time compiled code. As discussed, in some embodiments, the lock can remain unbiased until a thread acquires the lock, at which time the lock may become biased to the thread that is the first to acquire the lock after conversion from a lightweight lock to a biased lock. In some embodiments, the just-in-time compiler may subsequently bias the lock after conversion from a lightweight lock to a biased lock based on lock access heuristics gathered during execution of the application. For example, the just-in-time compiler may bias the lock towards the thread that has historically most frequently acquired the lock, towards the last thread that acquired the lock, and the like.

If, at block 420, the just-in-time compiler determines that the lock is currently locked, operations 400 may proceed to block 440, where the just-in-time compiler converts the lock to a biased lock that is biased towards the thread currently owning the lock. Generally, as discussed, by biasing the lock towards the thread currently owning the lock, the just-in-time compiler can assume that the thread that currently owns the lock is likely to acquire the lock in the future and can thus bias the lock such that the thread that currently owns the lock can acquire the lock without the execution of costly atomic operations. Other threads, which are assumed to be less likely to acquire the lock, can acquire the lock in the future, but through the use of atomic operations; however, because these other threads are expected to infrequently acquire the lock, the performance degradation from the execution of atomic operations to acquire the lock by these other threads may be offset from the performance gains from allowing the current owner of the lock to acquire the lock without performing atomic operations in respect of the object associated with the lock.

Figure 5:
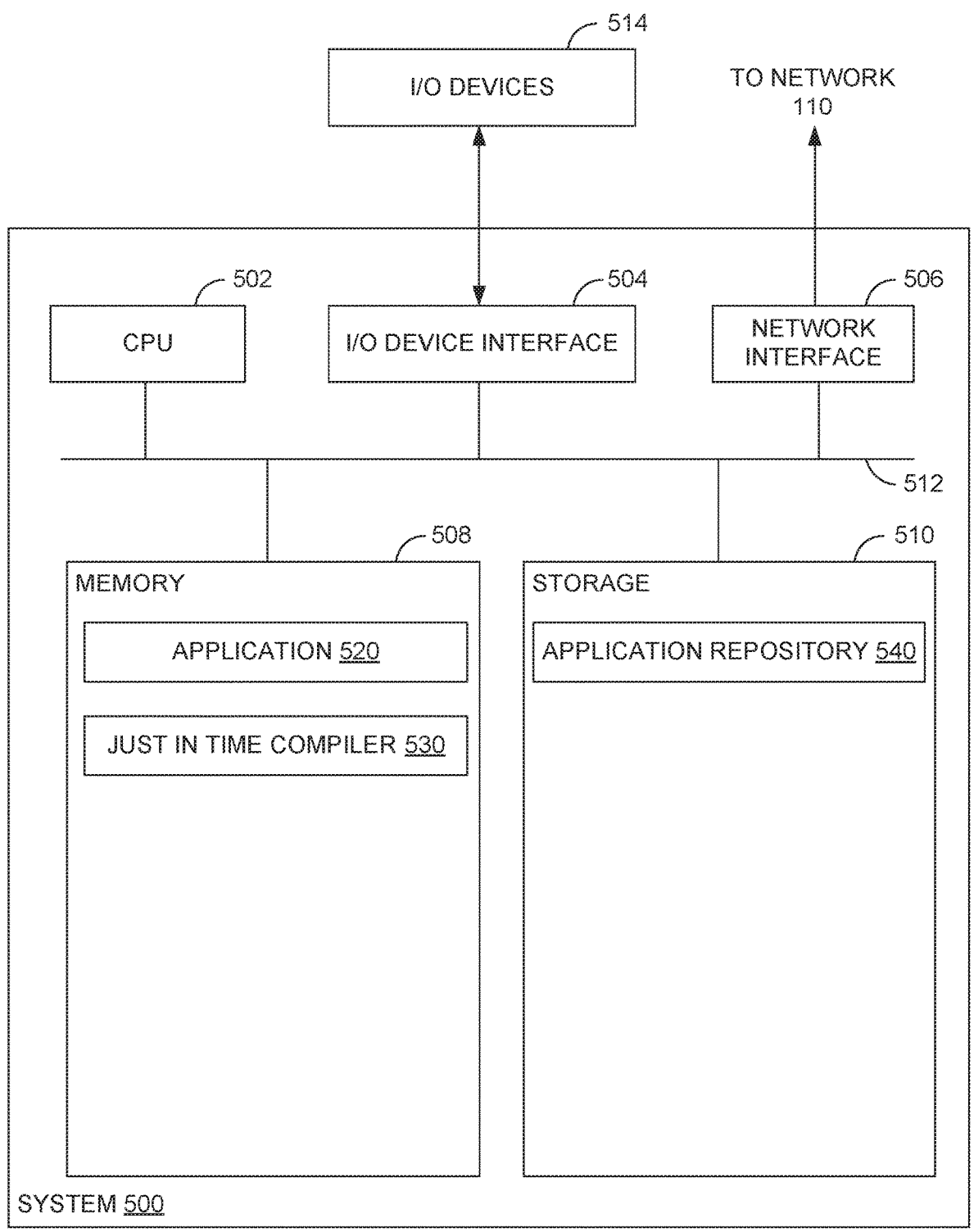
FIG. 5 illustrates an example system in which aspects of the present disclosure may be performed.

FIG. 5 illustrates an example system 500 that manages locks during execution of just-in-time compiled code for an application, according to an embodiment. As illustrated, system 500 includes, without limitation, a central processing unit 502, one or more I/O device interfaces 505, which may allow for the connection of various I/O devices 514 (e.g., keyboards, displays, mouse devices, pen input, etc.) to the entity analytics system 500, network interface 506, a memory 508, storage 510, and an interconnect 512.

CPU 502 may retrieve and execute programming instructions stored in the memory 508. Similarly, the CPU 502 may retrieve and store application residing in the memory 508.

The interconnect 512 transmits programming instructions and application data among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random access memory. Furthermore, storage 510 may be a disk drive, a solid state drive, a phase change memory device, or the like. Although shown as a single unit, the storage 510 may be a combination of fixed and/or removable storage devices, such as fixed disc drives, solid state drives, removable memory cards or optical storage, network attached storage (NAS), or a storage area network (SAN).

As illustrated, memory 508 includes an application 520 and a just-in-time compiler 530. Application 520 is representative of a variety of types of applications that are written in a language that is capable of just-in-time compilation, such as the Java programming language, and can perform various operations on the system 500. Just-in-time compiler 530 generally use source or intermediate code included in an application package associated with the application 520, compiles the source or intermediate code into machine code, and executes the machine code. Just-in-time compiler 530 additionally monitors for the acquisition of locks on objects in memory during execution of the application 520 and determines whether locks are eligible or ineligible for conversion to a biased lock. When execution of application 520 reaches a global safepoint, such as a time during which just-in-time compiler 530 performs garbage collection operations in respect of memory allocated to application 520, just-in-time compiler 530 can identify locks that are eligible for conversion to a biased lock and convert the eligible locks to biased locks prior to resuming execution of the application. The eligible locks may be biased based on a current lock state of the Storage 510, as illustrated, includes an application repository 540. Application repository 540 generally is illustrative of a data store in which application packages of source or intermediate code are stored prior to compilation and execution by just-in-time compiler 530. In some embodiments, application repository 540 may additionally store data used during execution of application 520.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for managing locks in just-in-time (JIT) compiled code of a software application executing on a computing device, comprising:
    during execution of the JIT compiled code, profiling locks by:
        identifying locks on resources accessed by the JIT compiled code, and
        recording access information for each of the identified locks; and
    at a safepoint during execution of the JIT compiled code:
        identifying, based on the recorded access information for each of the identified locks, one or more locks eligible for conversion to a biased lock, and
        converting each respective lock of the one or more eligible locks from a contention-based lock to a biased lock based on a current lock status of the respective lock, wherein the contention-based lock comprises a lock in which a thread uses atomic instructions to access a resource associated with the lock and the biased lock comprises a lock in which a thread with which the biased lock is biased uses nonatomic instructions to access the resource associated with the lock,
    wherein the safepoint comprises a time period during which a JIT compiler pauses execution of the software application to perform garbage collection operations in respect of the software application.

2. The method of claim 1, wherein identifying one or more locks eligible for conversion to a biased lock comprises:
    determining that a lock on a particular resource is accessed by multiple threads in the JIT compiled code; and
    based on the determination, adding the lock on the particular resource to a blacklist of locks ineligible for conversion to a biased lock.

3. The method of claim 1, wherein identifying one or more locks eligible for conversion to a biased lock comprises:
    determining that a lock on a particular resource has been accessed during a time window in excess of a threshold number of times and that the lock on the particular resource is currently accessed by a single thread in the JIT compiled code; and
    based on the determination, identifying the lock on the particular resource as a lock eligible for conversion to a biased lock.

4. The method of claim 3, wherein the threshold number of times is set based on a number of instructions executed between safepoints during execution of the JIT compiled code.

5. The method of claim 1, wherein converting each respective lock of the one or more eligible locks to a biased lock comprises:

determining that the respective lock is currently unlocked; and based on the determination, converting the respective lock into a biased lock that can be biased by any thread.

6. The method of claim 1, wherein converting each respective lock of the one or more eligible locks to a biased lock comprises:

determining that the respective lock is currently locked by an owning thread in the JIT compiled code; and based on the determination, converting the respective lock into a biased lock biased towards the owning thread.

7. The method of claim 1, further comprising:

at the safepoint during execution of the JIT compiled code, dynamically activating and deactivating lock profiling during execution of the JIT compiled code.

8. The method of claim 7, wherein dynamically activating and deactivating lock profiling is based on current performance metrics of the JIT compiled code executing on the computing device.

9. The method of claim 1, wherein activating lock profiling during execution of the JIT compiled code comprises inserting, into the software application, instructions for identifying a thread point, recording a thread lock address in a thread buffer, and accumulating a counter tracking a number of times a lock has been accessed by a thread in the JIT compiled code.

10. A system, comprising:

a processor; and a memory having instructions stored thereon which, when executed by the processor, performs an operation for managing locks in just-in-time (JIT) compiled code of a software application executing on a computing device, comprising:

during execution of the JIT compiled code, profiling locks by:

identifying locks on resources accessed by the JIT compiled code, and recording access information for each of the identified locks; and at a safepoint during execution of the JIT compiled code:

identifying, based on the recorded access information for each of the identified locks, one or more locks eligible for conversion to a biased lock, and converting each respective lock of the one or more eligible locks from a contention-based lock to a biased lock based on a current lock status of the respective lock, wherein the contention-based lock comprises a lock in which a thread uses atomic instructions to access a resource associated with the lock and the biased lock comprises a lock in which a thread with which the biased lock is biased uses nonatomic instructions to access the resource associated with the lock, wherein the safepoint comprises a time period during which a JIT compiler pauses execution of the software application to perform garbage collection operations in respect of the software application.

11. The system of claim 10, wherein identifying one or more locks eligible for conversion to a biased lock comprises:

determining that a lock on a particular resource is accessed by multiple threads in the JIT compiled code; and based on the determination, adding the lock on the particular resource to a blacklist of locks ineligible for conversion to a biased lock.

12. The system of claim 10, wherein identifying one or more locks eligible for conversion to a biased lock comprises:

determining that a lock on a particular resource has been accessed during a time window in excess of a threshold number of times and that the lock on the particular resource is currently accessed by a single thread in the JIT compiled code; and based on the determination, identifying the lock on the particular resource as a lock eligible for conversion to a biased lock.

13. The system of claim 12, wherein the threshold number of times is set based on a number of instructions executed between safepoints during execution of the JIT compiled code.

14. The system of claim 10, wherein converting each respective lock of the one or more eligible locks to a biased lock comprises:

determining that the respective lock is currently unlocked; and based on the determination, converting the respective lock into a biased lock that can be biased by any thread.

15. The system of claim 10, wherein converting each respective lock of the one or more eligible locks to a biased lock comprises:

determining that the respective lock is currently locked by an owning thread in the JIT compiled code; and based on the determination, converting the respective lock into a biased lock biased towards the owning thread.

16. The system of claim 10, further comprising:

at the safepoint during execution of the JIT compiled code, dynamically activating and deactivating lock profiling during execution of the JIT compiled code.

17. The system of claim 16, wherein dynamically activating and deactivating lock profiling is based on current performance metrics of the JIT compiled code executing on the computing device.

18. The system of claim 10, wherein activating lock profiling during execution of the JIT compiled code comprises inserting, into the software application, instructions for identifying a thread point, recording a thread lock address in a thread buffer, and accumulating a counter tracking a number of times a lock has been accessed by a thread in the JIT compiled code.

19. A non-transitory computer-readable medium having instructions stored thereon which, when executed by a processor, performs an operation for managing locks in just-in-time (JIT) compiled code of a software application executing on a computing device, comprising:

during execution of the JIT compiled code, profiling locks by:

identifying locks on resources accessed by the JIT compiled code, and recording access information for each of the identified locks; and at a safepoint during execution of the JIT compiled code:

identifying, based on the recorded access information for each of the identified locks, one or more locks eligible for conversion to a biased lock, and converting each respective lock of the one or more eligible locks from a contention-based lock to a biased lock based on a current lock status of the respective lock, wherein the contention-based lock comprises a lock in which a thread uses atomic instructions to access a resource associated with the lock and the biased lock comprises a lock in which a thread with which the biased lock is biased uses nonatomic instructions to access the resource associated with the lock, wherein the safepoint comprises a time period during which a JIT compiler pauses execution of the software application to perform garbage collection operations in respect of the software application.

20. The non-transitory computer-readable medium of claim 19, wherein identifying one or more locks eligible for conversion to a biased lock comprises:

determining that a lock on a particular resource has been accessed during a time window in excess of a threshold number of times and that the lock on the particular resource is currently accessed by a single thread in the JIT compiled code; and based on the determination, identifying the lock on the particular resource as a lock eligible for conversion to a biased lock.

21. The non-transitory computer-readable medium of claim 19, wherein converting each respective lock of the one or more eligible locks to a biased lock comprises:

determining that the respective lock is currently unlocked; and based on the determination, converting the respective lock into a biased lock that can be biased by any thread.

22. The non-transitory computer-readable medium of claim 19, wherein converting each respective lock of the one or more eligible locks to a biased lock comprises:

determining that the respective lock is currently locked by an owning thread in the JIT compiled code; and based on the determination, converting the respective lock into a biased lock biased towards the owning thread.

23. The non-transitory computer-readable medium of claim 19, further comprising:

at the safepoint during execution of the JIT compiled code, dynamically activating and deactivating lock profiling during execution of the JIT compiled code.

24. The method of claim 1, wherein identifying locks on resources accessed by the JIT compiled code comprises identifying locks on resources accessed by methods in the software application invoked more than a threshold number of times during execution of the software application.

25. The system of claim 10, wherein identifying locks on resources accessed by the JIT compiled code comprises identifying locks on resources accessed by methods in the software application invoked more than a threshold number of times during execution of the software application.

* * * * *